United States Patent Office 3,660,396
Patented May 2, 1972

3,660,396
CEPHALOSPORIN INTERMEDIATES AND PROCESS THEREFOR
Ian G. Wright, Greenwood, Ind., assignor to Eli Lilly and Company, Indianapolis, Ind.
No Drawing. Filed Mar. 4, 1970, Ser. No. 16,573
Int. Cl. C07d 99/24, 99/16
U.S. Cl. 260—243 C
12 Claims

ABSTRACT OF THE DISCLOSURE

2 - methylene- and 2-methyl - $\Delta^3$ - cephalosporin esters, and sulfoxides therof; e.g., 2,2,2-trichloroethyl 7-phenoxyacetamido - 2 - methylene - 3 - methyl-$\Delta^3$-cephem-4-carboxylate - 1 - oxide, as intermediates to new cephalosporin antibiotic substances.

INTRODUCTION

This invention relates to $\Delta^3$-cephalosporin esters, that is, to cephalosporin ester compounds having a carbon to carbon double bond between the carbon atoms in the 3 and 4 positions of the dihydrothiazine ring moiety of the cephalosporin ester compounds, in which the ring members are numbered, using the ring sulfur as the number 1 position. More particularly, this invention provides a group of new $\Delta^3$-cephalosporin ester sulfoxides having a methylene group ($CH_2=$) bonded to the carbon atom in the 2 - position of the dihydrothiazine ring moiety of the cephalosporin ester sulfoxide structure, as well as the reduction products thereof, where the 2-methylene group is reduced or converted to a 2-methyl group, and also those compounds in which the sulfur atom is in the bivalent state. The acid compounds from such esters are useful in that they inhibit the growth of microorganisms such as *Bacillus subtilus*, strain X-12. The esters are of more interest, however as intermediates for the preparation of 2-thiomethyl and 2 - thiomethylene ether cephalosporin compounds which can be converted to the sulfide acids in which form they are useful in inhibiting the growth of disease causing Gram positive microorganisms such as penicillin G resistant strains of *Staphylococcus aureus*.

BACKGROUND OF THE INVENTION

In recent years, new cephalosporin antibiotics such as cephalothin (U.S. Pat. 3,218,318) and cephaloridine (U.S. Pat. 3,449,338) have been discovered. These antibiotics are presently being manufactured as derivatives of fermentation derived cephalosporin C (U.S. Pat. No. 3,093,638), and its nucleus, 7-aminocephalosporanic acid (7–ACA) (U.S. Pat. 3,207,755). These antibiotics are very effective but are administered primarily by the parenteral route. More recently, those skilled in the cephalosporin antibiotic art have been working to develop cephalosporin type antibiotics which maybe absorbed into the blood when administered by the oral route. Two of such oral cephalosporin antibiotics being developed are cephaloglycin and cephalexin. Cephaloglycin can be made by acylating the cephalosporin C nucleus, 7–ACA, with an N-protected activated form of phenylglycine. Cephalexin can be prepared in a similar manner by acylating 7-aminodesacetoxycephalosporanic acid (7–ADCA) (U.S. Pat. 3,124,576), or an ester or other derivative thereof with the N-protected activated form of phenylglycine, and thereafter removing the protecting group. However, newly discovered processes (U.S. Pat. 3,275,626) have enabled the manufacture of cephalexin and numerous other cephalosporin antibiotics by acylation of the 7-aminodesacetoxycephalosporanate esters obtained by the ring expansion of a penicillin sulfoxide ester, e.g., a p-nitrobenzyl phenoxymethylpenicillin sulfoxide ester, followed by cleavage of the phenoxyacetyl side chain, and reacylation of the resulting 7 - aminodesacteoxycephalosporanate ester with the N-protected activated form of phenylglycine, and removal of the N-protecting group and the ester group to obtain cephalexin as the zwitterion, or a salt thereof with a pharmaceutically acceptable acid or base.

However, there is a need to find other new and useful compounds in this area, either to be useful as antibiotics themselves, or as intermediates to other antibiotic compounds having a strong potency or a different spectrum of activity against a variety of Gram positive and Gram negative microorganisms. A purpose of this invention is to provide the cephalosporin art with some new cephalosporin compounds which are useful as intermediates in the preparation of new and useful cephalosporin compounds which inhibit the growth of various microorganisms.

It is a specific object of this invention to provide a class of new 2-methylene- and 2-methyl-$\Delta^3$-cephalosporin ester sulfoxides and sulfides which are especially useful as intermediates to the production of new cephalosporin antibiotics.

SUMMARY OF THE INVENTION

Briefly, this invention provides new 2-methylene- and 2-methyl cephalosporin ester sulfoxides and sulfides having one of the following formulas:

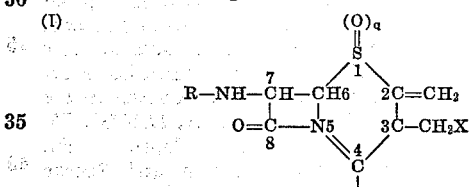

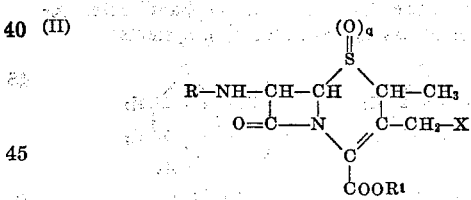

wherein in each of Formulas I and II R is an amino-protecting group, $R^1$ is hydrogen or is the residue of an ester group, preferably one which can be removed readily without disrupting the cephem ring structure, $q$ is 0 or 1, indicating the sulfide or sulfoxide state of the sulfur atom in the ring, and X is hydrogen, hydroxy, $C_1$ to $C_6$-alkanoyloxy, or $C_1$ to $C_6$-alkyloxy.

The 2-methylene-$\Delta^3$-cephalosporin sulfoxide esters are prepared, according to this invention, by treating with formaldehyde the corresponding $\Delta^3$-cephalosporin sulfoxide ester in the presence of a primary or secondary amine or an acid salt of such an amine. The 2-methyl-$\Delta^3$-cephalosporin sulfoxide esters are obtained by reducing the 2-methylene-$\Delta^3$-cephalosporin sulfoxide esters with hydrogen in the presence of a hydrogenation catalyst or by reaction with a dialkylborane. The corresponding 2-methylene- and 2-methyl-$\Delta^3$-cephalosporin esters (having the 1-sulfur in the sulfide state) are obtained by reducing the corresponding sulfoxides, according to methods now known, e.g., by treating the sulfoxides with (a) hydrogen in the presence of a hydrogenation catalyst, (b) stannous, ferrous, or manganous cations, (c) dithionite ($S_2O_4$), iodide, or ferricyanide anions, (d) trivalent phosphorus compounds having a molecular weight below 500, (e) a halomethylene iminium halide of the formula

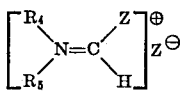

wherein Z denotes chlorine or bromine and each of $R_4$ and $R_5$ taken separately denote a $C_1$ to $C_3$ alkyl, or taken together with the nitrogen to which they are bonded complete a monocyclic-heterocyclic ring having from 5 to 6 ring forming atoms and a total of from 4 to 8 carbon atoms, or a halosilane compound having a formula selected from the group consisting of

wherein X is chlorine, bromine, or iodine and $R_1$ is hydrogen, chlorine, bromine, iodine, or a hydrocarbon radical free of aliphatic unsaturation having from 1 to 8 carbon atoms, and Y is hydrogen or $-SiR_1,R_2X$ wherein $R_1$, $R_2$ are the same as $R_1$ above, and X is as defined above, in the presence or absence of an activating agent which is an acid halide of an acid of carbon, sulfur, or phosphorus, which acid halide is inert to reduction by the reducing agent, and which acid halide has a second order hydrolysis constant, equal to, or greater than that of benzoyl chloride, in a substantially anhydrous liquid medium at a temperature of from about $-50°$ C. to about $100°$ C. to form the $\Delta^3$-cephalosporin ester.

DETAILED DESCRIPTION OF THE INVENTION

Specific starting materials, intermediates, and products of the process of this invention are sometimes named, for convenience, by use of the "cepham" nomenclature system. "Penam" nomenclature for the penicillins is described by Sheehan, Henery-Logan, and Johnson in the Journal of the American Chemical Society, (JACS), 75, 3292, footnote 2 (1953), and has ben adapted to the cephalosporins by Morin, Jackson, Flynn, and Roeske (JACS, 84, 3400 (1962)). In accordance with these systems of nomenclature "penam" and "cepham" refer respectively to the following saturated ring systems:

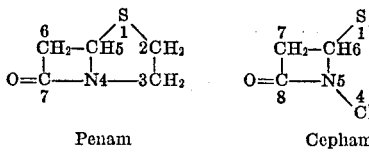

"Cepham" refers to the cepham ring structure containing a double bond, the position of which is indicated by a prefixed "$\Delta$" with a superscript denoting the lowest numbered carbon atom to which the double bond is connected, or by the word "delta" with the same number relationship. Sometimes the position of the double bond is indicated by the carbon atom number only. Thus, for example, penicillin V, 6-phenoxymethylpenicillin, can be named 6 - (phenoxyacetamido)-2,2-dimethylpenam-3-carboxylic acid, and 7-phenoxyacetamidodesacetoxycephalosporanic acid can be named as 7-phenoxyacetamido-3-methyl-$\Delta^3$-cephem-4-carboxylic acid.

The $\Delta^3$-cephalosporin sulfoxide starting materials are most conveniently described by the general formula

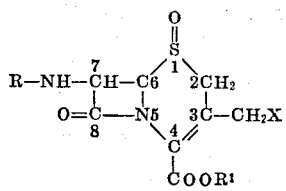

wherein R is an amino-protecting group which is not affected by the oxidizing reagents, esterification reagents, or the like used in preparing this starting material, $R^1$ denotes the carboxyl protecting group, preferably an easily removable ester group, or an anhydride group, and X is hydrogen, hydroxy, $C_1$ to $C_6$-alkanoyloxy, or $C_1$ to $C_6$-alkyloxy. The R group can be any known peptide blocking group, for example, triphenylmethyl, benzyloxycarbonyl, adamantyloxycarbonyl, methyl-substituted adamantyloxycarbonyl, $C_4$ to $C_6$-tert - alkyloxycarbonyl groups such as tert-butoxycarbonyl, tert-pentyloxycarbonyl, tert-hexyloxycarbonyl, $C_5$ to $C_7$-tert-alkenyloxycarbonyl groups such as tert-pentenyloxycarbonyl, tert-heptenyloxycarbonyl, a $C_5$ to $C_7$-tert-alkynyloxycarbonyl, groups such as tert-pentynyloxycarbonyl, tert-hexynyloxycarbonyl, tert-heptynyloxycarbonyl, a $C_4$ to $C_7$-cycloalkyloxycarbonyl group, such as cyclopentyloxycarbonyl, cyclohexyloxycarbonyl, and the like. R can also be an acyl group which are known in the penicillin and cephalosporin antibiotic literature. The selected acyl groups should be stable to the oxidizing and esterification conditions used in preparing the $\Delta^3$-cephalosporin sulfoxide ester starting materials, or be capable of protection by suitable blocking groups so as to remain stable. Examples of the preferred acyl groups which can be used as amino-protecting groups may be described by the formula

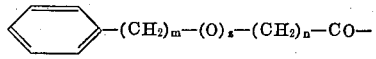

wherein $m$ is an integer of from 0 to 4 inclusive, $n$ is an integer of from 1 to 4 inclusive, $z$ is 0 or 1, and when $z$ is 0, the methylene carbon atoms in $m$ and $n$ are connected by a chemical bond, and such acyl groups substituted on phenyl carbon atoms with fluorine, chlorine, bromine, $C_1$ to $C_3$ alkyl, $C_1$ to $C_2$-alkoxy, nitro, cyano, or trifluoromethyl groups, 2-(2'-thienyl) acetyl, and N-(protected amino) phenylglycyl. A few representative examples of such preferred acyl groups include:

2-(2'-thienyl)-acetyl
D-N-(tert-butoxycarbonylamino)phenylglycyl
D-N-(enamine of methyl acetoacetate)phenylglycyl
D-N-(benzyloxycarbonylamino)phenylglycyl
phenylacetyl
phenoxyacetyl
benzyloxyacetyl
phenylpropionyl
phenylbutoxybutyryl
3-fluorophenoxyacetyl
4-bromophenylacetyl
2-chlorobenzyloxypropionyl
3-methylphenylbutyryl
3-cyanophenylpropionyl
4-trifluorophenoxyacetyl, and the like.

Numerous other compounds which form amino-protecting acyl groups which can be used in the R position are known in the prior art; e.g., those disclosed in the Behrens et al. U.S. Pats. 2,479,295 to 2,479,297, and 2,562,407 to 2,562,411, and 2,623,876. Other useful acyl groups include 2-thienylacetyl, 3-thienylacetyl, 2-furylacetyl, 3-furylacetyl, 2-(3,4-benzothienyl)acetyl, 2-(3,4-benzofuryl)acetyl, and the like.

The caboxyl-protecting group represented by $R^1$ in the above formula should be a group which is removable by the use of conditions and reagents which do not destroy the cepham nucleus of the cephalosporin structure. It is preferably an ester group which is removable by treating the ester with zinc, in a $C_1$ to $C_6$ alkanoic acid, or hydrochloric acid such as 2,2,2-trichloroethyl, a $C_4$ to $C_6$-tert-alkyl group such as tert-butyl, tert-pentyl, and tert-hexyl, a $C_5$ to $C_7$-tert-alkenyl or a $C_5$ to $C_7$-tert-alkynyl group such as tert-pentenyl, tert-hexenyl, tert-heptynyl, an ester group of the formula

where R" represents a $C_1$ to $C_6$ (lower) alkanoyl, N-phthalimido, benzoyl, naphthoyl, furoyl, thenoyl, nitrobenzoyl, halobenzoyl, methylbenzoyl, methanesulfonylbenzoyl, or phenylbenzoyl, which are described more fully in U.S. Pat. 3,284,451, or a benzyl, 3- or 4-nitrobenzyl, 3- or 4-methoxybenzyl, benzhydryl, trimethylsilyl group, or the like.

The X symbol bonded to the methylene carbon in the 3-position of the molecule can be any atom or group which does not interfere with or is stable to the oxidizing and esterification conditions used to prepare the starting material. For simplicity of operating the process we prefer that X be hydrogen, hydroxyl, $C_1$ to $C_6$-alkanoyloxy, or $C_1$ to $C_6$-alkyloxy, although a wide variety of equivalent groups can be used. X is hydrogen when the compound is a desacetoxycephalosporanic acid ester. Such compounds are formed when penicillin sulfoxide esters are heat rearranged under acid conditions, according to methods now known, e.g., as described in U.S. Pat. 3,275,626. When X is desired to be hydroxyl a corresponding 3-bromomethyl-$\Delta^2$-cephalosporin ester can be treated with water to replace the bromine with a hydroxyl group. A $C_1$ to $C_6$-alkyloxy group can be put into the X position in a similar manner by reacting the 3-bromoethyl-$\Delta^2$-cephalosporin ester with a $C_1$ to $C_6$-alkanol. Similarly, X can be a $C_1$ to $C_6$-alkanoyloxy group by reacting the 3-bromomethyl-$\Delta^2$-cephalosporin ester with a $C_1$ to $C_6$ alkanoic acid. Such an operation is not necessary where X is acetoxy since cephalosporanic acid already contains the 3-acetoxymethyl group. Commercially produced derivatives of this acid which can be used include 7-aminocephalosporanic acid which is obtained by cleavage of the 5-aminoadipoyl side chain from cephalosporin C by known methods. The 3-bromomethyl - $\Delta^3$ - cephalosporin esters which can be used to prepare the compounds of this invention can be prepared by brominating with N-bromosuccinimide a 3-methyl-$\Delta^2$-cephalosporin ester, preferably a $C_1$ to $C_6$-tert-alkyl or 2,2,2-trichloroethyl ester by methods now known.

The reaction between the formaldehyde, or an equivalent methylene group supplying reagent, and the selected $\Delta^3$-cephalosporin sulfoxide ester can be conducted in an aqueous or organic liquid medium, or in a mixed aqueous/organic solvent system, in the presence of a primary or secondary amine, or an acid salt of such an amine, at temperatures ranging from about 0° C. to the reflux temperature of the system, generally below about 120° C. Preferred amines are the $C_1$ to $C_6$-alkylamines, and di ($C_1$ to $C_6$) alkylamines such as methylamine, ethylamine, n-propylamine, isopropylamine, n- and isobutylamines, tert-butylamine, dimethylamine, diethylamine, dipropylamine, dibutylamine, piperidine, pyrrolidine, and the hydrochloride or sulfate or other acid salts of such amines. In general, the amine salts are preferred since they do not cause discoloration of the reaction mixture as much as do the free amines. Some salts such as ammonium chloride, trimethylamine hydrochloride, triethylamine hydrochloride, and zinc chloride give traces of product but the yields are much poorer than those when the primary and secondary amines are used. The formaldehyde may be used in any of its reactive forms such as trioxymethylene, solid polymeric formaldehyde, and the like, but with most of the selected $\Delta^3$-cephalosporin sulfoxide esters, an aqueous formaldehyde solution is preferred. In preferred procedures, reaction temperatures of from about 40° C. to about 110° C. for from 1 to about 24 hours are used to insure complete reaction. The reaction can be conducted under anhydrous conditions if necessary, as when a trimethylsilyl ester group is used, by using a formaldehyde condensation product in which water of condensation between the amine and the formaldehyde has been removed. For example, the reagent reported by P. Potier et al. (J. Am. Chem. Soc., 90, 5622 (1968)), which consists of N,N-dimethylformaldimonium trifluoroacetate generated from trimethylamine oxide and trifluoroacetic anhydride in anhydrous medium, may be used. An excess of the formaldehyde reactant, relative to the $\Delta^3$-cephalosporin sulfoxide ester is preferably used to insure complete reaction of the latter compound. The products of this step of the process of this invention have the general formula:

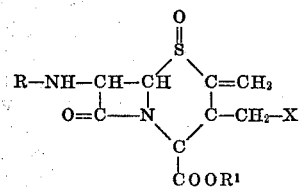

wherein, R, $R^1$, and X are as defined above. These products are referred to generally herein as the "2-methylene-$\Delta^3$cephalosporin ester sulfoxide" products in that the "2-methylene" refers to the $CH_2=$ group bonded to the carbon atom in the 2-position of the dihydrothiazine ring moiety of the cephalosporin compound; the "$\Delta^3$-cephalosporin" refers to the position of the carbon-to-carbon double bond in the bicyclic cephalosporin molecule, the "ester" indicates the presence and chemical state of the carboxyl group attached to the carbon atom in the 4-position; and the "sulfoxide" indicates that the sulfur in the 1-position of the cephalosporin molecule is in the sulfoxide oxidation state. For example, a preferred product of this step of the process, 2,2,2-trichloroethyl 7-(phenoxyacetamido)-2-methylene-3-methyl-$\Delta^3$-cephalosphorin ester sulfoxide, and is obtainable by the following sequence of reactions:

(1) Penicillin V (phenoxymethylpenicillin) is esterified with 2,2,2-trichloroethanol and oxidized to the 2,2,2-trichloroethyl penicillin V sulfoxide ester by procedures now known. Alternatively, the oxidation and esterification steps can be reversed.

(2) The resulting 2,2,2-trichloroethyl penicillin V sulfoxide ester is heat rearranged by heating from 80° C. to 150° C. in the presence of an acid such as p-toluenesulfonic acid while removing water from the reaction to form 2,2,2-trichloroethyl 3-methyl-7-phenoxyacetamido-$\Delta^3$-cephem-4-carboxylate ester.

(3) The 2,2,2-trichloroethyl 3-methyl-7-phenoxyacetamido-$\Delta^3$-cephem-4-carboxylate ester is treated with a peracid to oxidize the compound to 2,2,2-trichloroethyl 3 - methyl-7-phenoxyacetamido-$\Delta^3$-cephem-4-carboxylate 1-oxide (the sulfoxide), and (4) The sulfoxide from step 3 is treated with formaldehyde or an equivalent reagent in the presence of a primary or secondary amine, or an acid salt of such amine at a temperature of from about 0° C. to about 120° C. preferably from about 40° C. to about 110° C. in an aqueous or organic liquid medium to form the 2,2,2-trichloroethyl 2 - methylene-3-methyl-7-phenoxyacetamido-$\Delta^3$-cephem-4-carboxylate-1-oxide.

The new 2-methyl-$\Delta^3$-cephalosporin sulfoxide ester compounds are obtained by reducing the corresponding 2-methylene-$\Delta^3$-cephalosporin sulfoxide ester compounds by known catalytic hydrogenation procedures, e.g., by treatment with hydrogen in the presence of a palladium or rhodium on carbon or other suitable support, or by reacting the 2-methylene-$\Delta^3$-cephalosporanic acid ester with a dialkylborane having from 1 to 6 carbon atoms in each alkyl group.

The new 2-methylene - $\Delta^3$ - cephalosporin ester compounds and the 2-methyl-$\Delta^3$-cephalosporin ester compounds of this invention are those having the Formulas I and II indicated above where z is 0, and R, R', and X in each formula is as defined above. These cephalosporin compound (sulfides) are prepared by reducing the corresponding 2-methylene- or 2-methyl-$\Delta^3$-cephalosporin sulfoxide esters under conditions discussed hereinbelow.

The reducing agents or reactant used in the process of this invention may be divided into two classes: those requiring the presence of an external activating agent, and those which do not need an external activating agent. This latter class of reducing agents provides its own activation and does not need the presence of a third chemical activator reactant although the latter can be used therewith if desired. An activator as defined for this invention is a chemical molecule, ion, or moiety, which activates either the cephalosphorin sulfoxide or the reducing agent for the overall reduction process. We believe that coordination of the activator moiety with the cephalosporin sulfoxide group is the actual mechanism for activation in most reductions, but we do not wish to be limited to this chemical mechanism theory in this invention, nor is it meant to limit the invention to the use of chemicals that act as activators by this mechanism and exclude activators that may operate by some as yet unknown mechanism.

The first class of reducing agents requiring external activation are listed below:

(1) Hydrogen: Hydrogen will reduce the cephalosporin sulfoxide by hydrogenolysis in the presence of a noble metal catalyst such as palladium, platinum, rhodium, either as the finely divided metal element, or as a compound thereof, or on some support such as carbon or barium sulfate, and the like.

(2) Stannous, ferrous, cuprous, or manganous cations: These cations were used in the form of inorganic or organic compounds or complexes which are at least partially soluble in the liquid medium and are exemplified by stannous chloride, stannous fluoride, stannous acetate, stannous formate, ferrous chloride, ferrous oxalate, ferrous succinate, cuprous chloride, cuprous benzoate, cuprous oxide, manganous chloride, manganous acetate, manganous oxide, and the like, as well as such cations provided in the form of complexes with known chelating agents such as ethylenediaminetetraacetic acid (EDTA), nitrilotriacetic acid, and the like;

(3) Dithionite, iodide, ferrocyanide anions: The anions can be used in the form of various inorganic or organic salts or complexes which provide the anion to the reaction medium. A few examples of useful compounds containing these anions are alkali metal, particularly the sodium and potassium salts of dithionite, iodide, iodide, or ferrocyanide, as well as hydroiodic acid, ferrocyanic acid, and the like.

(4) Trivalent phosphorus compounds having a molecular weight below about 500. These compounds can be inorganic or organic and include phosphines as well as phosphinite, phosphonite, and phosphite esters containing one, two, three or mixtures of trivalent phosphorus-carbon, or trivalent phosphorus-sulfur bonds, as well as inorganic trivalent phosphorus halides and amides, and trivalent phosphorus compounds containing one or two phosphorus-halogen bonds with the remaining trivalent phosphorus bonds being satisfied by organic radicals as defined above. In general, such compounds are the organic compounds of trivalent phosphorus and are the triaryl phosphites, trialkyl phosphites, mixed aryl alkyl phosphites, as well as the corresponding phosphonites and phosphinite esters, and the triarylphosphines. In general, we prefer that such compounds have molecular weights below about 500 and are exemplified by triphenyl phosphite
tritolyl phosphite
trixylyl phosphite
tricresyl phosphite
trimethyl phosphite
triethyl phosphite
trihexyl phosphite
phenyl dimethyl phosphite
diphenyl ethyl phosphite
tolyl dihexyl phosphite
cresyl dimethyl phosphite
diphenyl phenylphosphonite
dicresyl cresylphosphonite
dimethyl methylphosphonite
dihexyl phenylphosphonite
methyl diphenylphosphinite
phenyl diethylphosphinite
xylyl dipropylphosphinite
cresyl dihexylphosphinites
triphenylphosphine
tritolylphosphine
trixylylphosphine
trimethylphosphine
tripropylphosphine and other trivalent phosphorus organic compounds with similar organic groups, as well as such compounds containing non-interferring substituents on carbon atoms of such compounds such as halogen, e.g., chlorine and bromine, such as tris(2-chloroethyl) phosphite
bis(2-chloroethyl) phenylphosphonite
2-chloroethyl dicresylphosphonite
tris(2-bromoethyl) phosphite and the trivalent phosphorus amide compounds N,N',N''-hexamethylphosphoramidite,
N,N',N''-hexaethylphosphoramidite, and
N,N,N''-tetramethyl(phenyl)phosphonodiamidite.

which may be used are those which contain at least one halogen such as chlorine or bromine, bonded directly to the trivalent phosphorus, e.g., phosphorus trichloride
phosphorus tribromide, and
phosphorus triiodide, as well as such trivalent phosphorus compounds having organic groups bonded to the trivalent phosphorus, as well as the halogen, e.g., phenyl phosphorodichloridite
dimethyl phosphorobromidite
phenyl hexyl phosphorochloridite
tolylphosphonodibromidite
cresylphosphonochloridite
p-chlorophenylphosphonodichloridite
diethylphosphinobromidite
diphenylphosphinochloridite
dixylylphosphinobromidite, and the like.

In general, trivalent phosphorus compounds having halogen bonded to the phosphorus will reduce the cephalosporin sulfoxides without the external activator.

(5) Halosilanes: The halosilanes can be used to reduce the sulfoxides to the sulfidide state with or without the presence of an external activating agent. Compounds of the above halosilane general formula include those wherein X is chlorine, bromine, and iodine, each of $R_1$ and $R_2$ is hydrogen, chlorine, bromine, or iodine, or an alkyl, phenyl, totyl, or xylyl such that the average molecular weight of the halosilane reducing agents below about 500. Examples of such compounds include: chlorosilane, bromosilane, iodosilane, silicondichloride, silicon dibromide, silicon diiodide, silicon trichloride, silicon tribromide, silicon triiodide, methylchlorosilane, ethylchlorosilane phenylchlorosilane, p-tolylchlorosilane 3,4-dimethylphenylchlorosilane, the corresponding bromosilanes, and iodosilanes, dimethylchlorosilane, diethylchlorosilane, dihexylchlorosilane, diphenylchlorosilane, and the corresponding bromosilanes, and iodisilanes; hexachlorodisilane, hexabromodisilane hexaiododisilane; dimethyltetrachlorodisilane, diethyltetrachlorodisilane, diphenyldichlorodisilane, and the corresponding bromodisilanes and iododisilanes tetramethyldichlorodislane, tetraphenyldichlorodisilane, and the corresponding bromodisilanes and iododisilanes, and the like.

(6) Halomethylene iminium halide compounds: These reducing agents have the formula

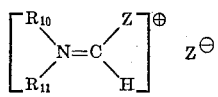

wherein Z is chlorine or bromine, each of $R_{10}$ and $R_{11}$ taken separately denote a $C_1$ to $C_1$-alkyl group, e.g., methyl, ethyl, propyl, isopropyl, or taken together with the nitrogen to which they are bonded complete a monocyclic heterocyclic ring having from 5 to 6 ring forming atoms and a total of from 4 to about 8 carbon atoms. These halo methylene iminium halide reducing agents can be prepared in situ, that is, in the reaction mixture for the process of this invention by reacting an appropriate formamide with a chlorinating or brominating agent. For example, by adding dimethylformamide and an equimolar amount of chlorinating agent such as oxalyl chloride, phosphorus oxychloride, thionyl chloride to the reaction mixture containing the $\Delta^3$-cephalosporin sulfoxide, there is formed chloromethylene N,N-dimethyliminium chloride, which reacts with the $\Delta^3$-cephalosporin sulfoxide to form the corresponding $\Delta^3$-cephalosporin. Other examples of halomethylene amide halides which may be used include:

bromomethylene N,N-diethyliminium bromide
chloromethylene N-pyrrolidiniminium chloride
bromomethylene N-piperidiniminium bromide and the like. The bromine analogs of such compounds also could be prepared and used in a similar manner from the respective brominating agents if desired. These halomethylene iminium halide reducing agents which are preferably prepared in situ, do not need the external activating agent (c).

The activating agent which may or may not be used in the process of this invention, depending upon the choice of reducing agent, is generally an acid halide of an acid of carbon, sulfur, or phosphorus and is preferably inert to reduction by the reducing agent, to economize on reactants, and consequently should not contain reducible groups such as nitro or sulfoxide. The acid halide used in this reduction process should be one that has a second order hydrolysis constant value in 90 percent acetone and water solution at least as great as that of benzoyl chloride, as set forth by Beck and Ugi, Chem. Ber., 94, 1839, (1961). Some substituted acid halides, e.g., possess higher hydrolysis constants than benzoyl chloride, but are ineffective for activation, presumably because the substituent group, e.g., nitro, is reduced and the resulting acid chloride has an undesirable slow hydrolysis rate.

Examples of carbon acid halides which may be used as activators include phosgene, carbonyl dibromide, oxalyl chloride, $C_2$ to $C_{10}$ alkanoic acid halides, preferably the chlorides or bromides, e.g., acetyl chloride, acetyl bromide, propionyl chloride, butanoyl bromide, hexanoyl chloride, octanoyl bromide, decanoyl chloride. Useful sulfur acid halides are exemplified by thionyl chloride, thionyl bromide, methanesulfonyl chloride. Phosphorus acid halides are represented by phosphorus oxychloride, phosphorus oxybromide, as well as the halogenated trivalent phosphorus compounds mentioned under reducing agents, e.g., phosphorus trichloride, methyl phosphorodichloridite, and the like.

In the practice of the process of this invention, many combinations of cephalosporin sulfoxides, reducing agents, and activators are possible. Not all combinations are equally effective, so that for a given reducing agent one or more activating agents will give optimum reductions of cephalosporin sulfoxides. In general, however, the most active activating agents are the chemically simplest ones, and are most generally applicable.

The cephalosporin sulfoxide is generally combined with at least a reducing equivalent of the reducing agent, and a nequivalent amount of the activating agent if the selected reducing agent is one that needs external activation. As a practical matter, at least a slight excess of reducing agent and activating agent are used, relative to the cephalosporin sulfoxide on a reducing equivalent basis to insure complete reduction thereof, because the sulfoxide is usually the most expensive of the three reactants. The liquid medium may be provided by any substantially anhydrous organic liquid which is inert to the reduction reaction, or can be provided by an excess of any liquid activating agent that is used, e.g., acetyl chloride, without detriment to the reactants or cephalosporin sulfide product. Although anhydrous conditions are preferred, the presence of a small amount of water in the mixture, under 5 percent, is not seriously detrimental to the reaction.

The sulfoxide reduction process may be conducted in a wide variety of organic solvents or diluents. Solvents suitable for hydrogenolysis in the presence of the noble metal catalysts such as platinum, palladium, or rhodium are those that dissolve both the cephalosporin sulfoxide, and the activator, that do not poison the catalyst, and are themselves inert to hydrogenation. Examples of such solvents are alkanoic acids, esters thereof, or the activating acid halide thereof, e.g., acetic acid, propionic acid, mixed pentanoic acids, ethyl acetate, amyl acetate, propionyl bromide, and the like. For the other types of reduction of this process, it is preferred to use a solvent that will at least partially dissolve the cephalosporin sulfoxide, reducing agent, and external activator, if used. For these reductions, the preferred solvents are inert to the action of reducing and activating agents. Since the best activators are acid halides, solvents containing hydroxyl, amino groups having hydrogen bonded to the amino groups, or free mercapto groups should not be used. Similarly, solvents containing readily reducible groups such as nitro and sulfoxide groups which may consume some of the reducing agent are not preferred because they are wasteful of reducing agents, although such solvents are not precluded if the cephalosporin sulfoxide reduction proceeds at a sufficiently greater rate than solvent reduction. Useful solvents or diluents for this purpose include the common hydrocarbon solvents such as benzene, toluene, xylene, heptane, esters such as ethyl acetate, amyl acetate, ethers such as ethyl ether and tetrahydrofuran, ketones such as acetone, methyl ethyl ketone, alkanenitriles such as acetonitrile, propionitrile, sulfones such as dimethylsulfone, diphenylsulfone, and tetramethylene sulfone (sulfolane), halogenated hydrocarbons such as dichloroethane, dichloromethane, chloroform, carbon tetrachloride, tertiary amides of carboxylic, phosphoric, phosphonic, phosphinic acids, and sulfonic acids which are liquid at the desired temperature of reduction, e.g., dimethylformamide, dimethylacetamide, diethylformamide, hexamethylphosphoramide, N,N, - N',N' - tetramethyl methylphosphonamide, N,N-dimethyl(dimethyl) - phosphinamide, N,N-dimethyl(methane)-sulfonamide, N,N-diethyl(phenyl)-sulfonamide, and the like. Some nitroparaffins are useful as solvents with certain reducing agents, e.g., nitromethane, nitroethane, and nitropropane. Of course, mixtures of solvents which provide ready dissolution of reactants and dissipation of heat of reaction are also contemplated for use in the process of this invention. If the activating agent used is a liquid, it can also serve as the solvent for the reactants if used in excess.

The temperature at which the reduction is conducted is a function of several factors. In general, the reduction can be conducted at temperatures of from about $-50°$ C. to about $100°$ C. However, most active activators coupled with the most active reducing reagents permit reduction at relatively low temperatures (below room temperatures) in short periods of time. If the selected reducing agent is less active, or if the reducing agent and activator combination used therewith is relatively slow reacting at low temperature, the temperature is raised to permit the reduction to proceed at a rate consistent with economics and optimum yield.

Examples of the various 2-methylene sulfoxide and sulfide compounds of this invention include the following:

2,2,2-trichloroethyl 7-(phenylacetamido)-2-methylene-3-methyl-$\Delta^3$-cephem-4-carboxylate-1-oxide, Benzyl 7-(penoxyacetamido)-2-methylene-3-acetoxymethyl-$\Delta^3$-cephem-4-carboxylate-1-oxide, Benzhydryl 7 - (4'-trifluoromethylphenylacetamido)-2-methylene-3(methoxymethyl)-$\Delta^3$-cephem - 4 - carboxylate-1-oxide, Tert-pentynyl 7-(4'-nitrophenoxyacetamido)-2-methylene-3-butanoyloxymethyl-$\Delta^3$-cephen - 4 - carboxylate-1-oxide, Phenacyl 7-(3'-chlorophenylacetamido)-2-methylene-3-acetoxymethyl-$\Delta^3$-cephem-4-carboxylate, p-Nitrobenzyl 7-[4-(N-benzyloxycarbonyl)aminophenoxyacetamido]-2-methylene - 3 - methyl-$\Delta^3$-cephem-4-carboxylate-1-oxide, Tert-butyl 7 - (3'-chlorophenoxyacetamido)-2-methylene-3-hydroxymethyl - $\Delta^3$ - cephem-4-carboxylate-1-oxide, Tert-pentyl 7-(2'-phenylacetamido)-2-methylene-3-(3'-hexyloxymethyl)-$\Delta^3$-cephem-4-carboxylate-1-oxide, 2,2,2 - trichloroethyl 7-(4'-phenylbutoxyacetamido)-2-methylene-3-methyl-$\Delta^3$-cephem - 4 - carboxylate-1-oxide;

Tert-hexenyl 7 - [4' - (tert-butoxycarbamidomethyl) phenyl]-acetamido-2-methylene - 3 - acetoxymethyl)-$\Delta^3$-cephem-4-carboxylate, Trimethylisilyl 7-[phenoxyacetamido]-2-methylene-3-tert-butoxymethyl)-$\Delta^3$-cephem-4-carboxylate, p-Nitrobenzyl 7-[N-(enamine from methyl acetoacetateamino)phenylglycylamido]-2-methylene - 3 - methyl-$\Delta^3$-cephem-4-carboxylate, 7-phenoxyacetamido - 2 - methylene - 3 - methyl-$\Delta^3$-cephem-4-carboxylic acid-1-oxide, Thenoylmethyl 7 - (phenylacetamido)-2-methylene-3-methyl-$\Delta^3$-cephem-4-carboxylate, Tert-phentynyl 7 - (phenylacetamido)-2-methylene-3-methyl-$\Delta^2$-cephem-4-carboxylate, Benzhydryl 7 - (2'-phenylethoxyacetamido)-2-methylene-3-methyl-$\Delta^3$-cephem-4-carboxylate, 2,2,2-trichloroethyl 7-(3'-chlorophenoxyacetamido)-2-methylene-3-hydroxymethyl-$\Delta^3$-cephem-4-carboxylate, 4-chlorobenzoyl 7 - (4'-nitrobenzyloxyacetamido)-2-methylene-3-acetomethyl-$\Delta^3$-cephem-4-carboxylate, 7-phenoxyacetamido - 2 - methylene - 3 - methyl-3-cephem-4-carboxylic acid, 7-(2'-thienylacetamido)-2-methylene - 3 - acetoxy-methyl-$\Delta^3$-cephem-4-carboxylic acid, 7-(D-$\alpha$-amino-$\alpha$-phenylacetamido - 2 - methylene-3-methyl-3-cephem-4-carboxylic acid, 7-(D-$\alpha$-amino-$\alpha$-(3'-thienylacetamido) - 2 - methylene-3-acetoxymethyl-3-cephem-4-carboxylic acid, 7-(D-$\alpha$-amino-$\alpha$-(2'-thienylacetamido) - 2,3 - dimethyl-3-cephem-4-carboxylic acid the latter three of which compounds can be prepared by cleaving the 7-phenoxyacetyl group from the 2-methylene ester, by treatment with p-toluenesulfonic acid, or with phosphorus pentachloride and pyridine, followed by re-acylation of the resulting 7-amino nucleus with an activated form of the N-protected phenylglycine, or N-protected 2'-thienylglycine, and then removing the N-protecting group and the ester group by known methods.

The following are exemplary compounds of the new 2-methyl-$\Delta^3$-cephalosporin ester sulfoxide type:

Tert-butyl 7-(3'-methoxyphenylacetamido)-2-methyl-3-acetoxymethyl)-$\Delta^3$-cephem-4-carboxylate-1-oxide Benzyl 7 - (3' - chlorophenoxyacetamido) - 2-methyl-3-methyl-$\Delta^3$-cephem-4-carboxylate-1-oxide 2,2,2-trichloroethyl 7-(6'-phenylhexanamido)-2-methyl-3 - (isopropyloxymethyl) - $\Delta^3$ - cephem - 4-carboxylate-1-oxide Benzhydryl 7-(2'-fluorophenylacetamido)-2-methyl-3-propionoxymethyl-$\Delta^3$-cephem-4-carboxylate-1-oxide Trimethylsilyl 7 - (capyrlamido)-2,3-dimethyl-$\Delta^3$-cephem-4-carboxylate-1-oxide 2,2,2-trichloroethyl 7-(phenoxyacetamido)-2-methyl-3-(propionoxymethyl)-$\Delta^3$-cephem-4-carboxylate 2,2,2-trichloroethyl 7-(phenylpropionamido)-2-methyl-3-(hexanoyloxymethyl)-$\Delta^3$-cephem-4-carboxylate Tert-butyl 7-(2'-thienylacetamido)-2-methyl-3-hydroxymethyl-$\Delta^3$-cephem-4-carboxylate Tert-pentynyl 7-(3'-hydroxyphenylacetamido)-2-methyl-3-hydroxymethyl-$\Delta^3$-cephem-4-carboxylate Trimethylsilyl 7-(3'-chlorophenoxyacetamido)-2-methyl-3-methoxymethyl-$\Delta^3$-cephem-4-carboxylate-1-oxide 2,2,2-trichloroethyl 7-(4'-nitrophenylacetamido)-2,3-dimethyl-$\Delta^3$-cephem-4-carboxylate Tert-butyl 7-phenylhexanoylamido-2-methyl-3-acetoxymethyl-$\Delta^3$-cephem-4-carboxylate 7 - phenoxyacetamido - 2,3 - dimethyl-3-cephem-4-carboxylic acid 7 - (2' - thienylacetamido) - 2-methyl-3-acetoxymethyl-3-cephem-4-carboxylic acid 7 - (d - $\alpha$-amino - $\alpha$ - phenylacetamido)-2-methyl-3-methoxymethyl-3-cephem-4-carboxylic acid, which can be prepared from tert-butyl 7-phenoxyacetamido-2-methyl-3-methoxymethyl-3-cephem-4-carboxylate by the cleavage, re-acylation, deblocking and ester group removal procedures described above.

In the following examples all temperatures are in degrees centigrade.

EXAMPLE 1

2,2,2 - trichloroethyl 7-phenoxyacetamido-2-methylene-3-methyl-$\Delta^3$-cephem-4-carboxylate-1-oxide A 15.0 gm. (30.3 millimoles) portion of 2,2,2-trichloroethyl 7-phenoxyacetamido-3-methyl-$\Delta^3$-cephem-4-carboxylate-1-oxide was dissolved in a small volume (40–50 ml.) of hot methylene chloride. To this solution were added 3.0 gm. (about 37 millimoles) of 37 percent aqueous formaldehyde and 2.46 gm. of N,N-dimethylamine hydrochloride with 500 ml. of tert-butanol. The mixture was allowed to reflux on a steam bath for 24 hours, and then was concentrated to about 300 ml. On cooling, "2-methylene sulfoxide" product, 2,2,2-trichloroethyl 7 - phenoxyacetamido - 2-methylene-3-methyl-$\Delta^3$-cephem-4 - carboxylate - 1 - oxide separated as fine, light-yellow needles (13.0 gm., M.P. 173–174° (d.)). Concentration of the mother liquors yielded a small second crop (1.6 gm., total yield 95.0 percent). Generally, this material was sufficiently pure to use in subsequent reactions. Recrystallization from methylene chloride-tert-butanol raised the melting point to 177–8° C. (d.). The assigned structure for the title compound was confirmed by IR, UV, and NMR spectral data and the following elemental analysis:

Analysis.—Calcd. for $C_{19}H_{17}N_2O_6Cl_3S$ (percent): C, 44.93; H, 3.37; N, 5.51; Cl, 20.94; S, 6.31. Found (percent): C, 45.05; H, 3.44; N, 5.43; Cl, 21.02; S, 6.20.

Under the same conditions of Example 1, the following catalysts give equally good results: Hydrochloride salts of methylamine, ethylamine, diethylamine, piperidine and pyrrolidine. Ammonium chloride, trimethylamine hydrochloride, triethylamine hydrobromide and zinc chloride gave less satisfactory results.

With free amines, such as piperidine and dimethylamine reaction occurs at room temperature, but the product is highly colored and difficult to purify.

The same 2-methylene sulfoxide (320 mg., M.P. 173–5° (d.)) obtained in Example 1, was obtained when 2,2,2-trichloroethyl 2-phenoxyacetamido-3-methyl-$\Delta^3$-cephem-4-carboxylate-1-oxide (750 mg., 1.5 mmoles) was heated under reflux for 25 hours in methylene chloride solution (10 ml.) with N,N-dimethylformaldimonium trifluoroacetate (2 mmoles). This reagent was prepared according to P. Potier et al. (J. Am. Chem. Soc., 90, 5622 (1968)), by dropwise addition of trifluoroacetic anhydride (0.28 ml., 2 mmoles) to an ice cold solution of freshly sublimed trimethylamine oxide (150 mg., 2 mmoles) in methylene chloride (10 ml.), allowing the solution to stand at room temperature for 1.25 hours, and removing solvent and excess reagents in vacuo.

EXAMPLE 2

4-nitrophenacyl 7-phenoxyacetamido-2-methylene-3-methyl-$\Delta^3$-cephem-4-carboxylate-1-oxide 4 - nitrophenacyl 7 - phenoxyacetamido - 3 - methyl-$\Delta^3$-cephem-4-carboxylate-1-oxide (7.28 gm., 13.8 mmoles), N,N - dimethylamine hydrochloride (1.12 gm., 13.8 mmoles) and formaldehyde (1.38 gm. 37 percent aqueous solution, 17.0 mmoles) were mixed in acetonitrile (400 ml.) and heated under reflux, with stirring, for 4 hours. A heavy precipitate formed after about 3.5 hours. The reaction mixture was allowed to cool to room temperature (overnight), then chilled in ice and filtered. The white crystalline product weighted 5.97 gm., M.P. 225–227° (d.). A second crop of the title 2-methylene sulfoxide was obtained from the concentrated mother liquors, weighing 0.50 gm., M.P. 222–224° (d.) for a combined total yield of 6.47 gm. (87 percent).

Analysis.—Calcd. for $C_{25}H_{21}N_3O_9S$ (percent): C, 55.62; H, 3.92; N, 7.79; S, 5.94. Found (percent): C, 55.80; H, 4.09; N, 7.69; S, 5.84. The structure was confirmed by infrared, ultraviolet and nuclear magnetic resonance spectral data.

EXAMPLE 3

4-nitrophenacyl 3-acetoxymethyl-2-methylene-7-(2-thienyl)acetamido-3-cephem-4-carboxylate-1-oxide 4-nitrophenacyl-3-acetoxymethyl - 7 - (2'-thienyl-acetamido) - 3 - cephem-4-carboxylate-1-oxide (6.5 g., 113 mmoles), dimethylamine hydrochloride (0.93 g., 11.3 mmoles), and 2 ml. of 37 percent formaldehyde solution were dissolved in 50 ml., of dimethylformamide and 150 ml. of t-butyl alcohol, and heated at 75° for 1 hour. The solution was poured into a beaker containing 400 ml. of saturated sodium chloride solution. The resulting precipitate was filtered, taken up into methylene chloride, and dried over anhydrous magnesium sulfate. Removal of the solvent yielded a white solid which was recrystallized from hot isopropanol containing a small amount of methylene chloride to give 4.0 g. (61 percent) of the titled 2-methylene sulfoxide; M.P. 195–197°.

Analysis.—Calcd. for $C_{22}H_{21}N_3O_{10}S_2$ (percent) : C, 51.10; H, 3.60; N, 7.15. Found (percent): C, 51.35; H, 3.82; N, 6.87. The structure was confirmed by infrared, ultraviolet, and nuclear magnetic resonance spectral data.

EXAMPLE 4 t-Butyl 7-phenoxyacetamido-2-methylene-3-methyl-$\Delta^3$-cephem-4-carboxylate-1-oxide t-Butyl 7-phenoxyacetamido-3-methyl-$\Delta^3$-cephem-4-carboxylate-1-oxide (13.4 gm., 31.9 mmoles), N,N-dimethylamine hydrochloride (2.55 gm., 31.3 mmoles) and formaldehyde (3.5 gm. of 37 percent aqueous solution, 43.2 mmoles) were dissolved in a mixture of N,N-dimethylformamide (DMF) (50 ml.) and dioxane (200 ml.) and heated under reflux, with stirring for 3.5 hours. The dioxane was removed in vacuo and the residual DMF solution was poured into ice cold 10 percent sodium chloride solution. (800 ml.). The precipitated product was filtered off, washed with water, dissolved in methylene chloride and extracted twice with water, dried over magnesium sulfate, filtered and evaporated to dryness in vacuo. The crude product (11.0 gm.) crystallized from benzene as a monosolvate (10.3 gm., 64 percent yield), M.P. 170–2° (d.).

Analysis.—Calcd. for $C_{21}H_{24}N_2O_6S$ (percent): C, 58.33; H, 5.59; N, 6.48; S, 7.41. Found (percent): C, 58.56; H, 5.55; N, 6.78; S, 7.13. The structure was confirmed by infrared, ultraviolet, and nuclear magnetic resonance spectral data.

Other 2-methylene-$\Delta^3$-cephem-sulfoxide esters were prepared, in general, by the above described procedures or minor modifications thereof. Some further examples are as follows:

2,2,2-trichloroethyl 7 - (phenoxyacetamido)-2-methylene-3-acetoxymethyl-$\Delta^3$-cephem-4-carboxylate-1-oxide was prepared from 2,2,2-trichloroethyl 7-(phenoxyacetamido)-3-acetoxymethyl-$\Delta^3$-cephem-4 - carboxylate according to Example 1.

4-methoxybenzyl 7 - (phenoxyacetamido) - 2 - methylene-3-methyl-$\Delta^3$-cephem-4-carboxylate-1 - oxide was prepared from 4-methoxybenzyl 7-(phenoxyacetamido)-3-methyl-$\Delta^3$-cephem-4-carboxylate-1-oxide according to Example 1.

2,2,2-trichloroethyl 7 - (2'-thienylacetamido)-2-methylene-3-acetoxymethyl-$\Delta^3$-cephem-4-carboxylate-1-oxide was prepared from 2,2,2 - trichloroethyl 7 - (2'-thienylacetamido)-3-acetoxymethyl-$\Delta^3$-cephem-4-carboxylate-1-oxide according to Example 1.

4-nitrobenzyl 7-(2'-thienylacetamido) - 2 - methylene-3-acetoxymethyl-$\Delta^3$-cephem-4-carboxylate - 1 - oxide was prepared from 4-nitrobenzyl 7-(2'-thiopheneacetamido)-3-acetoxymethyl-$\Delta^3$-cephem-4-carboxylate-1-oxide according to Example 3.

t-Butyl 7-(phenoxyacetamido)-2-methylene-3-hydroxymethyl-$\Delta^3$-cephem-4-carboxylate - 1 - oxide was prepared from t-butyl 7 - (phenoxyacetamido)-3-hydroxymethyl-$\Delta^3$-cephem-4-carboxylate-1-oxide according to Example 4.

EXAMPLE 5

2,2,2-trichloroethyl 7-(phenoxyacetamido)-2$\beta$,3-dimethyl-$\Delta^3$-cephem-4-carboxylate-1-oxide A 1 gm. (1.97 millimole) portion of 2,2,2-trichloroethyl 7-(phenoxyacetamido) - 2 - methylene-3-methyl-$\Delta^3$-cephem-4-carboxylate-1-oxide was suspended in 20 ml. of ethyl acetate containing about 2 ml. of acetic acid. This suspension was added to a suspension of 1.0 gm. of 5 percent rhodium-on-carbon catalyst in 10 ml. of ethyl acetate saturated with hydrogen and contained in an atmospheric pressure hydrogenation apparatus. The absorption of hydrogen ceased after about 60 minutes. A total of 44.0 ml. of hydrogen was absorbed, approximately 90 percent of the theoretical amount required. The catalyst was separated from the liquid and the liquid mixture was evaporated to dryness under vacuum. Crystallization of the residue from a methylene chloride tert-butanol mixture gave 750 mg. (75 percent yield in 2 crops) of the 2,2,2-trichloroethyl 7-(phenoxyacetamido)-2,3-dimethyl-$\Delta^3$-cephem-4-carboxylate-1-oxide as a mixture of isomers. One recrystallization of the isomer mixture from methylene chloride-ethyl acetate gave the major, 2$\beta$-methyl isomer, nearly pure (370 mg., M.P. 174–176° (d.). Further recrystallization raised the M.P. to 177–19° (d.).

The structure of this new 2$\beta$-methyl sulfoxide ester was deduced from infrared, ultraviolet, and nuclear magnetic resonance spectral and elemental analyses.

The other isomer, 2,2,2-trichloroethyl 7-(phenoxyacetamido) - 2$\alpha$, 3 - dimethyl-$\Delta^3$-cephem-4-carboxylate-1-oxide, present in smaller amounts, could be isolated pure by exhaustive fractional crystallization (M.P. 186–8° (d.)). It was also characterized by infrared, ultraviolet nuclear magnetic resonance spectra and elemental analyses.

The mother liquors from the reduction also contained 2,2,2-trichloroethyl 7-(phenoxyacetamido)-2,3-dimethyl-$\Delta^2$-cephem-4-carboxylate, the product of over reduction and double bond isomerization. It was not obtained crystalline and was characterized only by chromatographic and spectral properties.

EXAMPLE 6

2,2,2-trichloroethyl 7-phenoxyacetamido-2$\alpha$,3-dimethyl-$\Delta^3$-cephem-4-carboxylate-1-oxide was difficult to isolate pure according to Example 5. A more convenient preparation is as follows:

2,2,2-trichloroethyl 7-phenoxyacetamido-2-methylene-3-methyl-$\Delta^3$-cephem-4-carboxylate-1-oxide (5.0 gm., 9.185 mmoles) was dissolved in dry tetrahydrofuran (THF) (150 ml.). A 1 M solution of diisoamylborane (10 ml., 10 mmoles) in THF was added with stirring at room temperature and the reaction was followed by thin layer chromatographic (TLC) analysis. After 12 minutes and 70 minutes further proportions of diisoamylborane solution (5 ml.) were added, with little visible effect. After 90 minutes sodium acetate (2.4 gm.) and hydrogen peroxide (5 min. 30 percent aqueous solution) were added and the mixture stirred at room temperature for 2.25 hours longer. The products were isolated by diluting the reaction mixture with saturated salt solution and extracting with methylene chloride. The crude mixture of products (3.81 gm.) was chromatographed on silica gel (300 gm.) using benzene-ethyl acetate gradient elution (6 l. solvent total). The first major product to emerge from the column was 2,2,2-trichloroethyl 7-phenoxyacetamido - $2\alpha,3$ - dimethyl-$\Delta^3$-cephem-4-carboxylate (approximately 900 mg., not crystalline). The structure was confirmed by IR, UV, and NMR data.

The second major product eluted from the column was 2,2,2-trichloroethyl 7-(phenoxyacetamido)-$2\alpha,3$-dimethyl-$\Delta^3$-cephem-4-carboxylate-1-oxide (approximately 1.2 gm.) identical in all respects with the same product obtained in Example 5.

EXAMPLE 7

4-nitrophenacyl 7-(phenoxyacetamido)-2-methylene-3-methyl-$\Delta^3$-cephem-4-carboxylate 4 - nitrophenacyl 7-(phenoxyacetamido) - 2 - methylene-3-methyl-$\Delta^3$-cephem-4-carboxylate-1-oxide (1.95 gm., 2.62 mmole) (prepared according to Example 2) was dissolved in dimethylformamide (24 ml.) by heating on a steam bath and the solution was then cooled to 0° in an ice bath. To the vigorously stirred solution, $PCl_3$ (1.9 ml. 22 mmole) was added from a syringe over about 5 seconds. After 30 seconds, the reaction mixture was poured into 400 ml. ice cold 10 percent sodium chloride solution and the precipitated solid was separated by filtration through a filter aid (super-cell) and washed thoroughly with water. The solid was dissolved in ethylacetate, dried over $MgSO_4$ and filtered through a short column (6 cm.) of Woelm silica gel contained in a sintered glass funnel. The product, 4 - nitrophenacyl 7 - (phenoxyacetamido) - 2 - methylene - 3 - methyl - $\Delta^3$-cephem-4-carboxylate crystallized upon evaporation of the solvent. (1.09 gm., M.P. 147–9° (d.), 0.30 gm., M.P. 144–5° (d.), total yield 73 percent) and was characterized by infrared, ultraviolet, nuclear magnetic resonance, and elemental analysis.

EXAMPLE 8

2,2,2-trichloroethyl 7-phenoxyacetamido-2-methylene-3-methyl-$\Delta^3$-cephem-4-carboxylate 2,2,2-trichloroethyl 7-(phenoxyacetamido)-2-methylene-3 - methyl - $\Delta^3$ - cephem-4-carboxylate-1-oxide (20.0 gm., 39.5 mmoles) (prepared according to Example 1) was dissolved in a mixture of $CH_2Cl_2$ (200 ml.) and $CH_3CN$ (200 ml.) and cooled to $-40°$ in a Dry Ice acetonitrile bath. Finely powdered anhydrous stannous chloride (10 gm., 52.8 mmoles) was added, with stirring, followed by acetyl chloride (10 ml.). After 15 and 45 minutes at $-40°$, further portions of stannous chloride (5 gm.) and acetyl chloride (5 ml.) were added. After 70 minutes when TLC analysis showed reaction to be complete, methanol (50 ml.) was added to the cold reaction mixture and the whole was poured into ice water and extracted with $CH_2Cl_2$. The organic extract was washed with ice cold $NaHCO_3$ solution and with water, dried over $MgSO_4$ and filtered. The product crystallized upon evaporation of the solvent and was recrystallized from acetone, giving 2,2,2-trichloroethyl 7 - (phenoxyacetamido) - 2 - methylene-3-methyl-$\Delta^3$-cephem-4-carboxylate (12.61 gm., 65 percent yield), which was characterized by the infrared, ultraviolet, nuclear magnetic resonance spectra and elemental analysis.

EXAMPLE 9

2,2,2-trichloroethyl 7-phenoxyacetamido-$2\beta$-3-dimethyl-$\Delta^3$-cephem-4-carboxylate Under the conditions given in Example 8, a mixture of 2,2,2-trichloroethyl 7-phenoxyacetamido-$2\beta,3$-dimethyl-$\Delta^3$-cephem-4-carboxylate-1-oxide and the $2\alpha$ isomer (2.67 gm., 5.24 mmoles) was reduced. Under these conditions, only the $2\beta$-methyl isomer reacts, leaving the $2\alpha$-methyl isomer as the sulfoxide. Chromatography of the crude product (1.58 gm.) on silica gel (300 gm.) using a benzene-ethylacetate gradient (8 l.) gave, firstly, 2,2,2-trichloroethyl 7 - phenoxyacetamido - $2\beta$, 3 - dimethyl-$\Delta^3$-cephem-4-carboxylate (1.1 gm.) which was characterized by infrared, ultraviolet, and nuclear magnetic resonance spectra.

Eluted later from the column was the recovered, unchanged $2\alpha$-methyl sulfoxide (1.02 gm.).

EXAMPLE 10

2,2,2-trichloroethyl 7-phenoxyacetamido-$2\alpha,3$-dimethyl-$\Delta^3$-cephem-4-carboxylate 2,2,2-trichloroethyl 7-phenoxyacetamido-$2\alpha,3$-dimethyl-$\Delta^3$-cephem-4-carboxylate-1-oxide (760 mg., 1.49 mmoles) was dissolved in dimethylformamide (4 ml.) and cooled in an ice bath. $PCl_3$ (0.8 ml.) was added, the mixture was stirred at room temperature for 20 minutes, and then poured into ice cold 10 percent NaCl solution (100 ml.). The solid product was separated by filtration and washed with water, then taken up in ethyl acetate, dried over $MgSO_4$, filtered and evaporated to dryness. The product, 2,2,2 - trichloroethyl 7 - phenoxyacetamido-$2\alpha,3$-dimethyl-$\Delta^3$-cephem-4-carboxylate (650 mg.) was identical in all respects to the same compound obtained as in Example 6.

EXAMPLE 11

7-phenoxyacetamido-$2\beta,3$-dimethyl-$\Delta^3$-cephem-4-carboxylic acid 2,2,2-trichloroethyl 7-phenoxyacetamido-$2\beta,3$-dimethyl-$\Delta^3$-cephem-4-carboxylate (3.85 gm., 7.79 mmoles) was dissolved in 90 percent formic acid (140 ml.) at room temperature and zinc dust (14 gm.) added, with stirring. TLC analysis showed no further change after 10 minutes. The reaction was worked up after 55 minutes by filtering off the zinc (washed with methylene chloride) evaporrating the filtrate to dryness in vacuo and separating the crude product into acidic and neutral fractions by shaking between ethyl acetate and cold dilute sodium bicarbonate solution. The acidic material was precipitated from the aqueous extracts by adjusting the pH to 2.0 with dilute hydrochloric acid and was extracted with ethyl acetate. The acidic fraction (2.07 gm., 73.5 percent) was crystallized from acetone-acetonitrile several times, yielding 7-phenoxyacetamido - $2\beta,3$ - dimethyl - $\Delta^3$ - cephem-4-carboxylic acid (1.03 gm., M.P. 151–3°) characterized by a pKa (66 percent DMF) 5.10, as well as by infrared, ultraviolet, and nuclear magnetic resonance spectra, and elemental analysis.

EXAMPLE 12

7-phenoxyacetamido-$2\alpha,4$-dimethyl-$\Delta^3$-cephem-4-carboxylic acid 2,2,2-trichloroethyl 7-phenoxyacetamido-$2\alpha,3$-dimethyl-$\Delta^3$-cephem-4-carboxylate (4.23 gm., 3.56 mmoles) was dissolved in dimethylformamide (80 ml.) and cooled in an ice bath. Acetic acid (16 ml.) and zinc dust (4.0 gm.) were added and the mixture was stirred at 0° for 1.5 hours. The reaction mixture was then filtered through a filter aid (Super-Cel) pad and the residual zinc washed thoroughly with large volumes of ethyl acetate and water. The two phases were separated, each being washed several times with fresh solvent. The combined ethylacetate layers were evaporated to dryness in vacuo taken up in fresh ethyl acetate and extracted with cold, dilute sodium bicarbonate solution. The acidic product was precipitated from the sodium bicarbonate extracts by acidification to pH 2 with dilute HCl and extracted into ethyl acetate. The ethyl acetate solution was dried over $Na_2SO_4$, filtered and evaporated to dryness, giving the crude title 2α-methyl acid (2.46 gm., 78 percent) which was crystallized from ethyl acetate (M.P. 201–03° (d.)). It was characterized by pKa, infrared, ultraviolet, and nuclear magnetic resonance spectra and by elemental analysis.

EXAMPLE 13

7-phenoxyacetamido-2-methylene-3-methyl-cephem-4-carboxylic acid

When 2,2,2 - trichloroethyl 7 - phenoxyacetamido-2-methylene - 3 - methyl-Δ³-cephem-4-carboxylate (1.45 gm., 2.95 mmoles) was treated with zinc dust (5 gm.) in 90 percent acetic acid (60 ml.), there was obtained an acidic product (1.06 gm., 99 percent), which crystallized from acetone-acetonitrile, M.P. 155–6° (d.). It was identified as 7-phenoxyacetamido-2-methylene-3-methyl-cephem-4-carboxylic acid, pKa (66 percent DMF) 4.9. It was characterized by infrared, ultraviolet, and nuclear magnetic resonce spectra, and elemental analysis.

EXAMPLE 14

7-phenoxyacetamido-2-methylene-3-methyl-Δ³-cephem-4-carboxylic acid-1-oxide t-Butyl 7 - phenoxyacetamido - 2 - methylene-3-methyl-Δ³-cephem-4-carboxylic-1-oxide (2.0 gm., 4.63 mmoles) was dissolved in 98-199 percent formic acid (25 ml.) and allowed to stand at room temperature for .5 hour. The solvent was then removed in vacuo at room temperature and the solid residue was recrystallized from ethyl acetate (1.48 gm., 85 percent, M.P. 206–7° (d.)). Further recrystallization gave pure 7-phenoxyacetamido-2-methylene - 3 - methyl - Δ³-cephem-4-carboxylic acid-1-oxide, M.P. 209–210° (d.) characterized having a pKa (66 percent DMSO) 5.0, and by infrared, ultraviolet, and nuclear magnetic resonance spectra, and elemental analysis.

EXAMPLE 15

7-phenoxyacetamido-2-methylene-3-methyl-Δ³-cephem-4-carboxylic acid

7 - phenoxyacetamido - 2 - methylene-3-methyl-Δ³-cephem - 4 - carboxylic acid - 1 - oxide (580 mg., 1.55 mmoles) was dissolved in dimethylformamide (12 ml.) and cooled to −18° in an ice-methanol bath. Phosphorus trichloride (1.08 ml., 1.7 gm., 12.4 mmoles) was added in 5 seconds, and the reaction mixture was stirred for 30 seconds, and then poured into an ice cold solution of diammonium hydrogen orthophosphate (5 gm., 37.2 mmoles) in water (100 ml.). The pH was adjusted to pH 2.5 with a few drops of dilute hydrochloric acid and the mixture was extracted with ethyl acetate to separate the product. The ethylacetate solution was extracted with ice cold dilute sodium bicarbonate fraction to remove acidic materials. The aqueous layer was re-acidified with dilute hydrochloric acid, and then extracted with ethyl acetate. The crude acidic fraction weighed 190 mg. To a solution of this acidic fraction in dioxane there was added a solution of sodium acetate (45 mg.) in methanol. Upon slight concentration of the mixture under vacuum, the sodium salt of the title compound crystallized as off-white thread-like needles (140 mg.). Recrystallization from methanol/ethanol mixture produced dense yellow-colored granular crystals. Both crystal forms decomposed (turned black) between 160° and 180° C. without melting. The structure of the compound was proven by elemental analysis, infrared, ultraviolet, and nuclear magnectic reasonance spectra.

The 2-methylene- and 2 - methyl - 7 - acylamido - Δ³-cephem-4-carboxylic acid compounds of this invention are useful as antibiotics against a variety of Gram positive microorganisms. For example, the compound of Example 15 showed the following activities against four strains of penicillin G-resistant *Staphylococcus aureus*, by a standard gradient plate technique, the values being minimum inhibitory concentrations (M.I.C.) is micrograms of compound per milliliter of growth medium.

| | |
|---|---|
| V–41 | 0.5 |
| V–32 | 0.55 |
| X–400 | >20 |
| V–84 | 0.5 | and gave an M.I.C. value of 14.1 micrograms per milliliter against the *E. coli* organism, strain X–26.

The products of Examples 11 and 12 gave the following gradient plate (M.I.C.) antibiotic values against the indicated Gram positive penicillin G resistant *Staphylococcus aureus* strains of microorganisms.

| Strain | V–30 | V–32 | X–400 | V–84 |
|---|---|---|---|---|
| Example: | | | | |
| 11 | 9.7 | 12.8 | >20 | 10.4 |
| 12 | 11 | 15 | >20 | 12.2 |

I claim:

1. Compounds having a formula selected from the group consisting of (I)

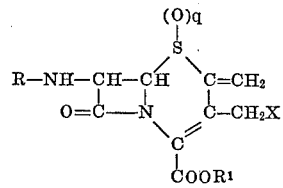

and (II)

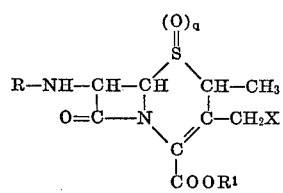

wherein R is an amino protecting group, $R^1$ is hydrogen or the residue of an ester group, which can be removed readily without disrupting the cepham ring structure, and X is hydrogen, hydroxy, a $C_1$ to $C_6$-alkanoyloxy, or $C_1$ to $C_6$-alkyloxy, and q is 0 or 1.

2. A compound as defined in claim 1 wherein the compound has Formula I in which R is an acyl group of the formula

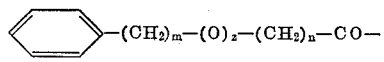

wherein each of m is an integer of from 0 to 4, n is an integer of from 1 to 4 inclusive, z is 0 or 1, and when z is 0, the carbon atoms in m and n are connected by a chemical bond, and such acyl groups substituted on phenyl carbon atoms with fluorine, chlorine, bromine, $C_1$ to $C_3$-alkyl, $C_1$ to $C_2$-alkyloxy, nitro, cyano, or trifluoromethyl, or a 2-(2'-thienyl)acetyl, N-(protected amino) phenylglycyl, $R^1$ is an ester selected from the group consisting of 2,2,2-trichloroethyl, a $C_4$ to $C_6$-tert-alkyl, a $C_5$ to $C_7$-tert-alkenyl, a $C_5$ to $C_7$-tert-alkynyl, a —$CH_2R''$ where $R''$ represents $C_1$ to $C_6$-alkanoyl, N-phthalimido, benzoyl, naphthoyl, furoyl, thenoyl, nitrobenzoyl, halobenzoyl, methylbenzoyl, methanesulfonylbenzoyl, or phenylbenzoyl, benzyl, 4-nitrobenzyl, 3- or 4-methoxybenzyl, benzhydryl, or trimethylsilyl, and X is hydrogen.

3. A compound as defined in claim 2 wherein the compound is 2,2,2-trichloroethyl 7-(phenoxyacetamido)-2-methylene - 3 - methyl - Δ³ - cephem - 4 - carboxylate-1-oxide.

4. A compound as defined in claim 2 wherein the compound is 2,2,2-trichloroethyl 7-(phenoxyacetamido)-

2-methylene - 3 - acetoxymethyl - Δ³ - cephem - 4 - carboxylate-1-oxide.

5. A compound as defined in claim 2 wherein the compound is a $C_4$ to $C_6$-tert-alkyl 7-(phenoxyacetamido)-2-methyl-3-methyl-Δ³-cephem-4-carboxylate-1-oxide.

6. A compound as defined in claim 1 wherein the compound has Formula II in which R is an acyl group of the formula

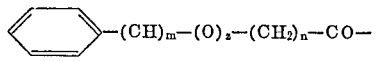

wherein each of $m$ is an integer of from 0 to 4, $n$ is an integer of from 1 to 4 inclusive, $z$ is 0 or 1, and when $z$ is 0, the carbon atoms in $m$ and $n$ are connected by a chemical bond, and such acyl groups substituted on phenyl carbon atoms with fluorine, chlorine, bromine, $C_1$ to $C_3$-alkyl, $C_1$ to $C_2$-alkyloxy, nitro, cyano, or trifluoromethyl, or a 2-(2'-thienyl)acetyl, N-(protected amino) phenylglycyl, $R^1$ is an ester selected from the group consisting of 2,2,2-trichloroethyl, a $C_4$ to $C_6$-tert-alkyl, a $C_5$ to $C_7$-tert-alkenyl, a $C_5$ to $C_7$-tert-alkynyl, a —$CH_2R''$ where $R''$ represents $C_2$ to $C_6$-alkanoyl, N-phthalimido, benzoyl, naphthoyl, furoyl, thenoyl, nitrobenzoyl, methanesulfonylbenzoyl, or phenylbenzoyl, benzyl, 4-nitrobenzyl, 3- or 4-methoxybenzyl, benzhydryl, or trimethylsilyl, and X is hydrogen.

7. A compound as defined in claim 6 wherein the compound is 2,2,2-trichloroethyl 7-(phenoxyacetamido)-2,3-dimethyl-Δ³-cephem-4-carboxylate-1-oxide.

8. A process which comprises treating with formaldehyde in the presence of a primary or secondary amine or a strong acid salt of such an amine a cephalosporin sulfoxide of the formula (III)

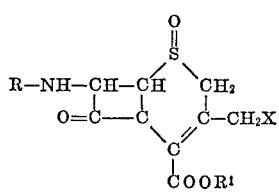

wherein R is an amino protecting group, $R^1$ is the residue of an ester, which can be removed readily without disrupting the cephem ring structure, and X is hydrogen, hydroxy, $C_1$ to $C_6$-alkanoyloxy, or a $C_1$ to $C_6$-alkyloxy, to obtain a compound of the formula

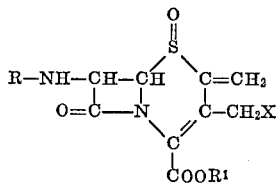

wherein R, $R^1$, and X are as defined above.

9. A process as defined in claim 8 which further includes the steps of reducing the 2-methylene-Δ³-cephalosporin sulfoxide ester with a reagent selected from the group consisting of (a) hydrogen in the presence of a hydrogenation catalyst, and (b) a dialkylborane having from 1 to 6 carbon atoms in each alkyl radical to form the 2-methyl Δ³-cephalosporin sulfoxide ester.

10. A process as defined in claim 8 wherein the 2-methylene Δ³-cephalosporin sulfoxide ester is one in which R is an acyl group of the formula

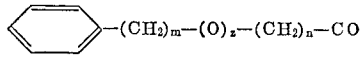

wherein each of $m$ is an integer of from 0 to 4, $n$ is an integer of from 1 to 4 inclusive, $z$ is 0 or 1, and when $z$ is 0, the carbon atoms in $m$ and $n$ are connected by a chemical bond, and such acyl groups substituted on phenyl carbon atoms with fluorine, chlorine, bromine, $C_1$ to $C_3$-alkyl, $C_1$ to $C_2$-alkyloxy, nitro, cyano, or trifluoromethyl or a 2-(2'-thienyl)acetyl, N-(protected amino) phenylglycyl, $R^1$ is an ester selected from the group consisting of 2,2,2-trichloroethyl, a $C_4$ to $C_6$-tert-alkyl, a $C_5$ to $C_7$-tert-alkenyl, a $C_5$ to $C_7$-tert-alkynyl, a —$CH_2R''$ where $R''$ represents $C_1$ to $C_6$-alkanoyl, N-phthalimido, benzoyl, naphthoyl, furoyl, thenoyl, nitrobenzoyl, methanesulfonylbenzoyl, or phenylbenzoyl, benzyl, 4-nitrobenzyl, 3- or 4-methoxybenzyl, benzhydryl, or trimethylsilyl, and X is hydrogen.

11. A process as defined in claim 10 wherein 2,2,2-trichloroethyl 7 - (phenoxyacetamido) - 3 - methyl - Δ³-cephem-4-carboxylate-1-oxide is treated with formaldehyde in the presence of a $C_1$ to $C_6$-primary or di($C_1$ to $C_6$)-secondary alkylamine hydrohalide to form 2,2,2-trichloroethyl 7 - (phenoxyacetamido) - 2 - methylene-3-methyl-4-carboxylate-1-oxide.

12. A process as defined in claim 11 wherein 2,2,2-trichloroethyl 7 - (phenoxyacetamido) - 2 - methylene-3-methyl-Δ³-cephem-4-carboxylate-1-oxide is hydrogenated in the presence of a hydrogenation catalyst to form 2,2,2-trichloroethyl 7 - (phenoxyacetamido) - 2,3 - dimethyl-Δ³-cephem-4-carboxylate-1-oxide.

References Cited
UNITED STATES PATENTS 3,516,997   6/1970   Takano et al. ____ 260—243 C NICHOLAS S. RIZZO, Primary Examiner U.S. Cl. X.R.

260—239.1; 424—246

UNITED STATES PATENT OFFICE
CERTIFICATE OF CORRECTION

Patent No. 3,660,396     Dated May 2, 1972

Inventor(s)    Ian G. Wright

It is certified that error appears in the above-identified patent and that said Letters Patent are hereby corrected as shown below:

Column 2, in structure (I)

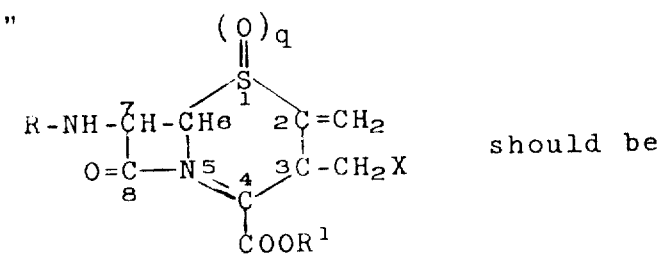   should be   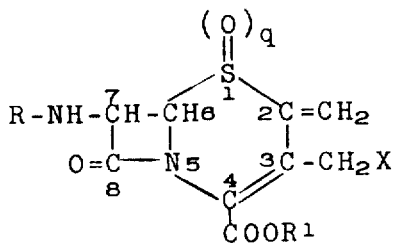

Column 3, line 51, "Cepham" should read --cephem--.

Column 4, line 61, "caboxyl-protecting" should read --carboxyl-protecting--.

Column 4, line 64, "cepham" should read --cephem--.

Column 6, in the structure, approximating lines 5 to 15, the structure should read as follows:

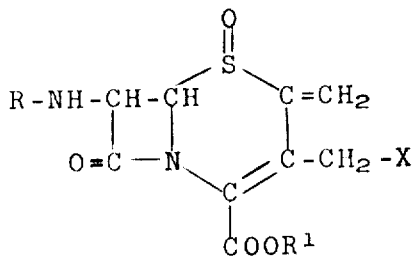

Signed and sealed this 6th day of February 1973.

(SEAL)
Attest:

EDWARD M. FLETCHER, JR.
Attesting Officer

ROBERT GOTTSCHALK
Commissioner of Patents